Patented Nov. 13, 1945

2,388,743

UNITED STATES PATENT OFFICE 2,388,743

MANUFACTURE OF DIBENZANTHRONE COMPOUNDS

Edward T. Howell, Wilmington, Del., assignor to E. I. du Pont de Nemours & Company, Wilmington, Del., a corporation of Delaware No Drawing. Application February 23, 1944, Serial No. 523,577

4 Claims. (Cl. 260—357)

This invention relates to the manufacture of dibenzanthrone compounds, and, more particularly, to an improved process for ring-closing 2,2'-dibenzanthronyls to the corresponding dibenzanthrones.

In U. S. P. 1,564,423, the preparation of 2,2'-dibenzanthronyl as a distinct compound was described, as well as the ring-closure of this product to dibenzanthrone. As illustrated by the several examples in this patent, the ring-closure was effected either by caustic alkali fusions or by the use of acid condensing agents such as aluminum chloride and related compounds, or, as illustrated in Example 6, by means of sulfuric acid with mercury sulfate as the catalyst. Up to the present time, the generally accepted method for effecting ring-closure of 2,2'-dibenzanthronyl compounds has been by the alkaline fusion methods, although, as illustrated in U. S. P. 2,022,884, methods have been perfected for carrying out the ring-closure with aluminum chloride.

Where fusion of the 2,2'-dibenzanthronyl is carried out by means of caustic alkali, the resulting product is obtained in the form of a crude amorphous mass which requires redissolving in concentrated sulfuric acid to obtain it in the form of crystals of high purity.

It is an object of this invention to provide a simple and economical process for ring-closing 2,2'-dibenzanthronyls in sulfuric acid whereby a crystalline product of high purity can be directly obtained. It is a further object to provide a method for effecting ring-closure of 2,2'-dibenzanthronyls which can be carried out under conditions which do not cause the splitting-off of halogen that may be contained in the molecule, whereby halogen derivatives of dibenzanthrone can be obtained by a direct synthesis.

I have found that 2,2'-dibenzanthronyls can be ring-closed in concentrated sulfuric acid where there is employed, in the ring-closure mass, an oxidizing agent of the class consisting of alkali metal nitrites, nitrosyl sulfuric acid, arsenic acid (which may be added as such or in the form of its alkali metal salts) and arsenic pentoxide. The ring-closure is preferably carried out in sulfuric acid of from 80% to 90% strength at temperatures of from 115° to 140° C. Higher temperatures may be employed, provided the temperature is not sufficiently high as to cause sulfonation of the resulting dibenzanthrone compound. The 2,2'-dibenzanthronyl is soluble in sulfuric acid of 80% or higher, whereas the dibenzanthrone is almost completely insoluble in sulfuric acid as low as 92%; therefore, in the ring-closure of the 2,2'-dibenzanthronyl in sulfuric acid of from 80% to 90% strength, the resulting dibenzanthrone compound is precipitated out in crystalline form as the ring-closure proceeds.

By this process, a product is obtained which contains only negligible amounts of sulfur, which does not seriously affect the shade or solubility of dyeings made therefrom.

While in Example 6 of U. S. P. 1,564,423 the ring-closure of 2,2'-dibenzanthronyl in sulfuric acid in the presence of mercuric sulfate at temperatures of from 230° to 240° C. is disclosed, it has been found that, under the conditions of this example, the resulting dibenzanthrone compound contains from 2.24% to 2.33% of sulfur, which is equivalent to 37.5% and 39%, respectively, of the monosulfonic acid. With this amount of sulfur, the shade of the dyeings and the usefulness of the product is seriously affected. It is also found that, when this reaction is carried out even at temperatures as low as 150° C., a product having similar sulfur content is obtained. It will be noted that, in this example, the mercuric sulfate is apparently employed only in catalytic amounts, for only one part is employed for ten parts of the dibenzanthrone.

According to the present invention, the oxidizing agents employed, which are very mild in their action, are used in molecular proportions based on the 2,2'-dibenzanthronyl compound to be ring-closed, and to obtain maximum yields some excess over that theoretically required is used. The amount of oxidizing agents to be employed is preferably from 2.5 to 3 mols per mol of dibenzanthronyl, the amount of excess being dependent, in some degree, upon the concentration of sulfuric acid employed in carrying out the reaction.

The following examples are given to illustrate the invention. The parts used are by weight.

Example 1

Twenty (20) parts of purified 2,2'-dibenzanthronyl are added in portions with agitation to 300 parts of 96% sulfuric acid. When completely dissolved, the mass is cooled to 5° C. and 7.5 parts of sodium nitrite are added in small portions uniformly during a period of about one hour, maintaining the temperature at 5°–8° C. Thirty-nine (39) parts of water are added during a period of about one hour, keeping the temperature at 15° C. or under. When all of the water has been added, the temperature is raised to 135° C. in not less than six hours, and the mass is held at 135°–140° C. with agitation for sixteen hours, or until the reaction mass shows no further change. On cooling, microscopic examination shows the resulting product as ribbon-like crystals. The mass is filtered on a porous plate filter and washed with 200 parts of 85% sulfuric acid. The filter cake is digested in from 200 to 300 parts of water, filtered, washed acid-free and dried. The product thus obtained contains only .27% sulfur and dyes in shade and strength equal to the purified dibenzanthrone such as obtained, for example, according to Example 1 of U. S. P. 2,180,299.

Example 2

Twenty (20) parts of purified 2,2'-dibenzanthronyl are dissolved in 300 parts of 96% sulfuric acid, then 39 parts of water are added during not less than one hour while the temperature is maintained at not over 40° C. When all of the water has been added, the temperature is raised to 140° C. and 128 parts of a solution of nitrosyl sulfuric acid in concentrated sulfuric acid (equivalent to 5.9 parts of nitrous acid) are added uniformly during about two and one-half hours at 135°–140° C. The reaction mass is stirred for four hours at this same temperature, and then cooled to 30°–35° C. Microscopic examination of a sample shows crystals similar to those obtained in Example 1. The mass is worked up as in Example 1. The crystalline dibenzanthrone thus obtained is essentially the same in quality and yield as that obtained in Example 1.

Example 3

Thirty-five (35) parts of purified 2,2'-dibenzanthronyl are dissolved at room temperature in 210 parts of 96% sulfuric acid. Thirty-three (33) parts of water are added uniformly during a period of about one hour, while the temperature is maintained at 35° C. or below. Thirty-one (31) parts of 93.65% arsenic acid ($H_3AsO_4$) are added, and the reaction mass is heated to 135° C. and stirred for eighteen hours at that temperature, or until the reaction mass shows no further change. After cooling to at least 30°–40° C., microscopic examination of a sample shows a copious crystalline formation of the dibenzanthrone. The mass is then diluted into 2000 parts of water and filtered, washed acid-free and dried. The dibenzanthrone thus obtained contains less than 0.3% sulfur.

Where the reaction is carried out as above, but instead of diluting the reaction mass in water it is filtered on a porous plate and the filter cake is washed with 250 parts of 85% sulfuric acid, the product obtained is substantially the same as that obtained in Example 1.

Where the reaction is carried out as in Example 3, but instead of diluting the reaction mass into water it is fortified up to 95%–96% sulfuric acid by the gradual addition of fuming sulfuric acid (this addition must be done at a temperature not exceeding 10° C. in order to avoid sulfonation), the reaction mass remains rather pasty until the higher concentration is reached, and then it undergoes partial solution and reprecipitation of crystals of altered form which may be filtered on a porous plate filter, giving dibenzanthrone of a purity equal to the specially purified material described in U. S. P. 2,180,299, Example 1.

Example 4

Thirty-five (35) parts of purified 2,2'-dibenzanthronyl are dissolved in 210 parts of 96% sulfuric acid and 35 parts of water are added uniformly during a period of about one hour. 23.5 parts of arsenic pentoxide are added and the temperature is raised to 135° C. and held eighteen hours at 135°–140° C. The reaction mass is cooled to 30° C. and is diluted into 2000 parts of water. The precipitate is filtered, washed acid-free and dried. The dibenzanthrone so obtained is essentially equal in yield and quality to that of Example 3.

Example 5

Eighteen and one-half (18.5) parts of dibromo-2,2'-dibenzanthronyl (obtained by brominating the dibenzanthronyl in excess bromine) are dissolved in 185 parts of 96% sulfuric acid. 12.3 parts of water are added over a period of about one hour, followed by 14 parts of arsenic pentoxide. The mass is heated to 135° C. and held eighteen hours at 135°–140° C. The temperature is then lowered to 30° C. and the mass is diluted into 1850 parts of water and is filtered and washed acid-free. Based on the bromine content, the compound is 95% dibromo-dibenzanthrone. It vats with red violet color without fluorescence, and is soluble in concentrated sulfuric acid with red-violet color. It dyes cotton navy blue of somewhat greener shade than that of dibenzanthrone.

Example 6

Twenty (20) parts of bis-dianthraquinonyl-amino-2,2'-dibenzanthronyl (obtained by the Ullmann reaction from two mols of 1-amino-anthraquinone and one mol of dibromo-2,2'-dibenzanthronyl) are dissolved in 200 parts of sulfuric acid 96%. 32.7 parts of water are added, followed by 8 parts of arsenic pentoxide. The temperature is raised to 135° C. and is held eighteen hours at 135°–140° C. and is then cooled to 30° C. A microscopic examination of a sample shows the product precipitated as small black crystals. The reaction mass is diluted into water, filtered, and the filter cake is washed acid-free. The product so obtained, which is believed to be bis-dianthraquinonyl-amino-dibenzanthrone, is soluble in concentrated sulfuric acid with an olive-black color, vats with a similar color, and dyes cotton from the vat in olive-gray shades.

Not all oxidizing agents may be employed in this reaction, for it is found that, with the oxidizing agents which operate catalytically to effect oxidation at the expense of the sulfuric acid with the liberation of sulfur dioxide, there is effected an undesirable amount of sulfonation of the resulting dibenzanthrone compounds. In some cases with the stronger oxidizing agents, oxo-dibenzanthrones are formed, or destructive oxidation of the 2,2'-dibenzanthronyl takes place. With the selective group of oxidizing agents of this invention, the ring-closure of the 2,2'-dibenzanthronyl and its derivatives can be carried out at temperatures as low as 115° C., with the production of dibenzanthrone of high purity and in high yields.

While the sulfuric acid employed may vary between 80% and 90% concentration in the case of the 2,2'-dibenzanthronyl itself, where nitrous acid is used as the oxidizing agent, the sulfuric acid content is preferably held at approximately 85%. With arsenic acid, the reaction can be carried out efficiently with acid of approximately 82% strength. Since the velocity of the reaction generally falls off when acids of the lower concentration are employed, it is preferred that the ring-closure be carried out in sulfuric acid of 82% to 90%. In general, it is best to operate at as low an acid concentration as possible, consistent with reasonable reaction velocity, since with the lower concentrations sulfonation of the resulting product is held to a negligible amount.

The amount of sulfuric acid in which the dibenzanthronyl compound is dissolved may be varied within wide limits. From 5 to 15 parts of acid per part of dibenzanthronyl compound gives satisfactory results, although, again, it is desirable to operate with only the amount of sulfuric acid necessary to give a good solution, for the less sulfuric acid used, the less is the tendency toward sulfonation of the products.

While best results appear to be obtained when all of the materials which are dissolved in the sulfuric acid are mixed together followed by heating, as illustrated in the above examples, under certain circumstances it may be desirable to add the oxidizing agent at the reaction temperature or to add the dibenzanthronyl to a solution of the oxidizing agent in sulfuric acid at the reaction temperature. The reaction is usually brought to completion when operating at temperatures of from 135° to 140° C. at from six to eighteen hours. With the sodium nitrite, the reaction comes to completion more quickly than when using the pentavalent arsenic compounds.

The progress of the reaction may be followed by means of a microscope. Tests of small samples removed at intervals show the formation of the crystals of the dibenzanthrone compound, and, when the field surrounding the crystals no longer shows a change in appearance, the reaction may be considered complete. As illustrated in the above examples, the filter cake, after filtering of the reaction mass, may be washed with sulfuric acid of the same or greater strength employed in carrying out the reaction, or the reaction mass may be treated with fuming sulfuric acid under cooling conditions to give a higher acidity than that originally present. Where the arsenic compounds are employed, the mass may be diluted in water, filtered, and washed acid-free. In all cases the dibenzanthrone is obtained of equal or superior quality to that of the best crudes obtained by the previously known methods, and in high yields. This method of ring-closing, 2,2'-dibenzanthronyl offers an advantage over the caustic alkali fusion methods in that it gives the dibenzanthrone compound directly and in a crystalline form which is readily filtered and purified merely by washing with water or dilute sulfuric acid. Since sulfuric acid is an extremely cheap reaction medium, the process is a very economical one, for it gives the dibenzanthrone compound in high purity without resort to additional purification methods. The process also offers the further advantage that the halogen-containing derivatives of the 2,2'-dibenzanthronyl can be ring-closed to the corresponding dibenzanthrone compounds without loss of halogen in the reaction. With the caustic alkali fusions, very little halogen can be retained in the molecule. The sulfur content of the products ring-closed under the conditions as above described is no more than that often found to be present in the dibenzanthrone compounds as a result of the usual acid-pasting methods, wherein the dibenzanthrone is dissolved and recrystallized in concentrated sulfuric acids, and such small sulfur content in no manner interferes with the dyeing properties or use of the dibenzanthrone compounds.

I claim:

1. The process of ring-closing 2,2'-dibenzanthronyl compounds to the corresponding dibenzanthrones which comprises dissolving the 2,2'-dibenzanthronyl compound in sulfuric acid of from 80% to 90% strength and heating at temperatures of from 115° to 140° C. in the presence of an oxidizing agent of the group consisting of alkali metal nitrites, nitrosyl sulfuric acid, arsenic acid and arsenic pentoxide.

2. The process of ring-closing 2,2'-dibenzanthronyl to dibenzanthrone which comprises dissolving the 2,2'-dibenzanthronyl in sulfuric acid of from 80% to 90% strength and heating at temperatures of from 115° to 140° C. in the presence of an oxidizing agent of the group consisting of alkali metal nitrites, nitrosyl sulfuric acid, arsenic acid and arsenic pentoxide.

3. The process of ring-closing 2,2'-dibenzanthronyl compounds to the corresponding dibenzanthrones which comprises dissolving the 2,2'-dibenzanthronyl compound in sulfuric acid of from 80% to 90% strength and heating at temperatures of from 115° to 140° C. in the presence of arsenic acid.

4. The process of ring-closing 2,2'-dibenzanthronyl to dibenzanthrone which comprises dissolving the 2,2'-dibenzanthronyl in sulfuric acid of from 80% to 90% strength and heating at temperatures of from 115° to 140° C. in the presence of arsenic acid.

EDWARD T. HOWELL.